US012586545B2

(12) United States Patent
Wang et al.

(10) Patent No.: US 12,586,545 B2
(45) Date of Patent: Mar. 24, 2026

(54) DISPLAY DRIVING MODULE AND CHIP, ELECTRONIC DEVICE, AND ITS METHOD

(71) Applicant: AMLOGIC (SHANGHAI) CO., LTD, Shanghai (CN)

(72) Inventors: Dongjian Wang, Shanghai (CN); Tao Ji, Shanghai (CN); Xuyun Chen, Shanghai (CN)

(73) Assignee: AMLOGIC (SHANGHAI) CO., LTD, Shanghai (CN)

( * ) Notice: Subject to any disclaimer, the term of this patent is extended or adjusted under 35 U.S.C. 154(b) by 416 days.

(21) Appl. No.: 18/249,049

(22) PCT Filed: Oct. 13, 2021

(86) PCT No.: PCT/CN2021/123524
§ 371 (c)(1),
(2) Date: Apr. 13, 2023

(87) PCT Pub. No.: WO2022/078382
PCT Pub. Date: Apr. 21, 2022

(65) Prior Publication Data
US 2023/0410269 A1 Dec. 21, 2023

(30) Foreign Application Priority Data

Oct. 14, 2020 (CN) .......................... 202011094776.6

(51) Int. Cl.
*G09G 3/36* (2006.01)
*G06T 3/4007* (2024.01)
(Continued)

(52) U.S. Cl.
CPC ............. *G09G 3/36* (2013.01); *G06T 3/4007* (2013.01); *G06T 5/50* (2013.01); *G06T 7/11* (2017.01);
(Continued)

(58) Field of Classification Search
CPC ............. G09G 3/36; G09G 2320/0252; G09G 2320/0261; G09G 2320/106;
(Continued)

(56) References Cited

U.S. PATENT DOCUMENTS

2018/0308415 A1 10/2018 Hsu et al.
2020/0154129 A1 5/2020 Su et al.

FOREIGN PATENT DOCUMENTS

CN 1428755 A 7/2003
CN 1716373 A 1/2006
(Continued)

OTHER PUBLICATIONS

Office Action Received in Chinese Application No. 202011094776. 6, dated Jul. 11, 2024.
(Continued)

*Primary Examiner* — Devona E Faulk
(74) *Attorney, Agent, or Firm* — Knobbe, Martens, Olson & Bear, LLP

(57) ABSTRACT

The present disclosure relates to a display driving method, module, chip, electronic device, and a storage medium. Some embodiments of the present disclosure provide a display driving method, module, chip, electronic device, and a storage medium to improve the quality of the image presented. The present disclosure relates in part to the field of semiconductor integrated circuits.

20 Claims, 4 Drawing Sheets

(51) Int. Cl.

| | | |
|---|---|---|
| *G06T 5/50* | (2006.01) | |
| *G06T 7/11* | (2017.01) | |
| *G06T 7/223* | (2017.01) | |

(52) U.S. Cl.
CPC .... *G06T 7/223* (2017.01); *G06T 2207/10024* (2013.01); *G06T 2207/20021* (2013.01); *G09G 2320/0252* (2013.01); *G09G 2320/0261* (2013.01); *G09G 2320/106* (2013.01); *G09G 2340/02* (2013.01); *G09G 2340/0407* (2013.01)

(58) Field of Classification Search
CPC ....... G09G 2340/02; G09G 2340/0407; G09G 2340/16; G06T 3/4007; G06T 5/50; G06T 7/11; G06T 7/223; G06T 2207/10024; G06T 2207/20021; G06T 1/20; G06T 2200/28; G06T 2207/10004; G06T 5/00; G06T 5/90
See application file for complete search history.

(56) References Cited

FOREIGN PATENT DOCUMENTS

| | | | |
|---|---|---|---|
| CN | 101426138 A | 5/2009 | |
| CN | 101945284 A | 1/2011 | |
| CN | 105139339 A | 12/2015 | |
| CN | 105263027 A | 1/2016 | |
| CN | 105448263 A | 3/2016 | |
| CN | 111210790 A | * | 5/2020 | .......... G09G 3/3696 |
| CN | 111210790 B | * | 7/2020 | .......... G09G 3/3696 |
| CN | 111385583 A | 7/2020 | |
| WO | WO 2019/084801 A1 | 5/2019 | |

OTHER PUBLICATIONS

Search Report and Written Opinion received in International Application No. PCT/CN2021/123524, dated Jan. 14, 2022.

Extended European Search Report issued in EP Application No. 21879425.3, dated Oct. 11, 2024.

Office Action issued in Chinese Application No. 202011094776.6, dated Feb. 15, 2025.

Wang et al., "High Performance Overdrive Using Improved Motion Adaptive Codec in LCD." IEEE Transactions on Consumer Electronics, Feb. 2009, 55(1): 20-26.

* cited by examiner

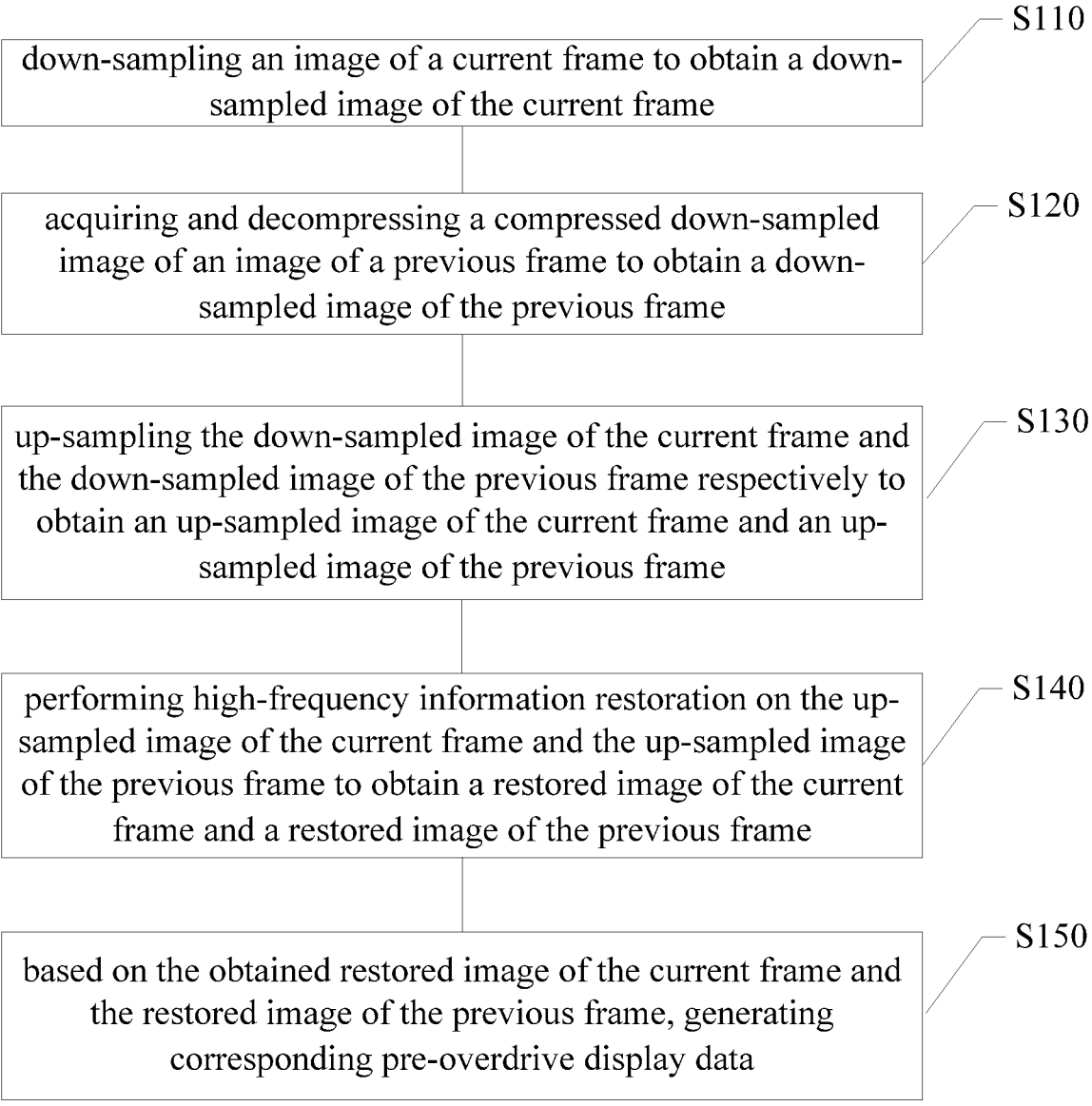

S110 down-sampling an image of a current frame to obtain a down-sampled image of the current frame

S120 acquiring and decompressing a compressed down-sampled image of an image of a previous frame to obtain a down-sampled image of the previous frame

S130 up-sampling the down-sampled image of the current frame and the down-sampled image of the previous frame respectively to obtain an up-sampled image of the current frame and an up-sampled image of the previous frame

S140 performing high-frequency information restoration on the up-sampled image of the current frame and the up-sampled image of the previous frame to obtain a restored image of the current frame and a restored image of the previous frame

S150 based on the obtained restored image of the current frame and the restored image of the previous frame, generating corresponding pre-overdrive display data

FIG. 1

DISPLAY DRIVING MODULE AND CHIP, ELECTRONIC DEVICE, AND ITS METHOD

TECHNICAL FIELD

The present disclosure relates to the technical field of semiconductor integrated circuits, and in particular, to a display driving method, module, chip, electronic device, and a storage medium.

BACKGROUND

When displaying a dynamic image by LCD devices, it takes longer time than the frame interval to change the grayscale of pixels to a target value, sometimes even when the data of the next frame should be displayed, the target value of gray scale cannot be reached, resulting in the so-called "dynamic image streaking" phenomenon.

To improve the so-called "dynamic image streaking" phenomenon mentioned above, a display driving method called pre-overdrive has been developed, which reduces the time required for grayscale changing by driving the LCD with a voltage change that exceeds the gray change of pixels between frames.

However, the quality of the image presented by the existing display driving method needs to be improved.

SUMMARY

Some embodiments of the present disclosure provide a display driving method, module, chip, electronic device, and a storage medium, to improve the quality of the image presented.

In some embodiments, a display driving method comprising: down-sampling an image of a current frame to obtain a down-sampled image of the current frame; acquiring and decompressing a compressed down-sampled image of an image of a previous frame to obtain a down-sampled image of the previous frame; up-sampling the down-sampled image of the current frame and the down-sampled image of the previous frame respectively to obtain an up-sampled image of the current frame and an up-sampled image of the previous frame; performing high-frequency information restoration on the up-sampled image of the current frame and the up-sampled image of the previous frame to obtain a restored image of the current frame and a restored image of the previous frame; based on the obtained restored image of the current frame and the restored image of the previous frame, generating corresponding pre-overdrive display data.

The technical solutions of embodiments of the present disclosure have the following advantages: the display driving method, module, chip, electronic device and a storage medium provided by embodiments of the present disclosure, wherein obtain an up-sampled image of the current frame and an up-sampled image of the previous frame by up-sampling the down-sampled image of the current frame and the down-sampled image of the previous frame respectively, perform high-frequency information restoration on the up-sampled image of the current frame and the up-sampled image of the previous frame to obtain a restored image of the current frame and a restored image of the previous frame, and generate corresponding pre-overdrive display data on the basis of the obtained restored image of the current frame and the restored image of the previous frame, since the restored image of the previous frame is obtained after the high-frequency detail restoration of the up-sampled image of the previous frame, the image quality reduction caused by the loss of high-frequency detail in the restored image of the previous frame can be avoided, thus the quality of the presented picture can be improved and the user's experience can be improved.

In some embodiments, performing high-frequency information restoration on the up-sampled image of the previous frame comprises: dividing the down-sampled image of the previous frame into corresponding multiple sub-blocks; traversing the sub-blocks in the down-sampled image of the previous frame to obtain a current sub-block to be traversed; obtaining a matching block in the down-sampled image of the current frame corresponding to the current sub-block in the down-sampled image of the previous frame; calculating a motion vector of the current sub-block in the down-sampled image of the previous frame pointing to the corresponding matching block in the down-sampled image of the current frame and a confidence coefficient of the motion vector; based on the calculated motion vector and a high-frequency image of the current frame extracted from the image of the current frame, calculating a high-frequency restored image of the corresponding sub-block in the image of the previous frame; based on the high-frequency restored image of the corresponding sub-block in the image of the previous frame and the confidence coefficient of the motion vector corresponding to the current sub-block in the down-sampled image of the previous frame, calculating a restored image of the corresponding sub-block in the image of previous frame; and obtaining a next sub-block in the down-sampled image of the previous frame as the current sub-block to be traversed, and restarting execution from the step of obtaining a matching block in the down-sampled image of the current frame corresponding to the current sub-block in the down-sampled image of the previous frame, until the traversal of the sub-blocks in the down-sampled image of the previous frame is completed.

In some embodiments, calculating a restored image of the corresponding sub-block in the image of the previous frame by the following formula: $pre\_fs'=pre\_us+\alpha*pre\_hp$; wherein, $pre\_fs$ indicates the restored image of the corresponding sub-block in the image of the previous frame, $pre\_us$ indicates the up-sampled image of the corresponding sub-block in the up-sampled image of the previous frame, $\alpha$ indicates the confidence coefficient of the motion vector of the current sub-block in the down-sampled image of the previous frame pointing to the corresponding matching block in the down-sampled image of the current frame, $pre\_hp$ indicates the high-frequency restored image of the corresponding sub-block in the up-sampled image of the previous frame.

In some embodiments, performing high-frequency information restoration on the up-sampled image of the current frame comprises: based on the calculated confidence coefficient of the motion vector corresponding to each sub-block in the down-sampled image of the previous frame, and a high-frequency image of the current frame extracted from the image of the current frame, performing high-frequency information restoration on each corresponding sub-block in the up-sampled image of the current frame.

In some embodiments, based on the calculated confidence coefficient of the motion vector corresponding to each sub-block in the down-sampled image of the previous frame, and a high-frequency image of the current frame extracted from the image of the current frame, performing high-frequency information restoration on each corresponding sub-block in the up-sampled image of the current frame comprises: traversing the sub-blocks in the down-sampled image of the previous frame to obtain a current sub-block to be traversed; determining whether the confidence coefficient of the motion vector corresponding to the current sub-block is greater than or equal to a preset confidence coefficient threshold; in response to a determination that the confidence coefficient of the motion vector corresponding to the current sub-block is greater than or equal to a preset confidence coefficient threshold, based on the calculated confidence coefficient of the motion vector corresponding to the current sub-block and a high-frequency image of the current frame extracted from the image of the current frame, calculating a restored image of the corresponding sub-block in the image of the current frame; and obtaining a next sub-block in the down-sampled image of the previous frame as the current sub-block to be traversed, and restarting execution from the step of determining whether the confidence coefficient of the motion vector corresponding to the current sub-block is greater than or equal to a preset confidence coefficient threshold, until the traversal of all sub-blocks in the down-sampled image of the previous frame is completed.

In some embodiments, in response to a determination that the confidence coefficient of the motion vector corresponding to the current sub-block is greater than or equal to a preset confidence coefficient threshold, calculating a restored image of the corresponding sub-block in the image of the previous frame by the following formula: $cur\_fs'=cur\_us+\alpha*cur\_hp$; wherein, $cur\_fs'$ indicates the restored image of the corresponding sub-block in the image of the current frame, $cur\_us$ indicates the up-sampled image of the corresponding sub-block in the up-sampled image of the current frame, $\alpha$ indicates the confidence coefficient of the motion vector of the current sub-block in the down-sampled image of the previous frame pointing to the corresponding matching block in the down-sampled image of the current frame, $cur\_hp$ indicates the high-frequency image of the corresponding sub-block in the image of the current frame.

In some embodiments, in response to a determination that the confidence coefficient of the motion vector corresponding to the current sub-block is smaller than the confidence coefficient threshold, based on a high-frequency image of the current frame extracted from the image of the current frame, and the calculated motion vector and the confidence coefficient of the motion vector corresponding to each sub-block, performing high-frequency information restoration on each corresponding sub-block in the up-sampled image of the current frame further comprises: configuring the image of the corresponding sub-block in the image of the current frame as the restored image of the corresponding sub-block in the restored image of the current frame.

In some embodiments, in response to a determination that the confidence coefficient of the motion vector corresponding to the current sub-block is smaller than the confidence coefficient threshold, calculating the restored image of the corresponding sub-block in the image of the current frame by the following formula: $cur\_fs'=cur\_us+cur\_hp$; wherein, $cur\_fs'$ indicates the restored image of the corresponding sub-block in the image of the current frame, $cur\_us$ indicates the up-sampled image of the corresponding sub-block in the up-sampled image of the current frame, $cur\_hp$ indicates the high-frequency image of the corresponding sub-block in the image of the current frame.

In some embodiments, up-sampling the down-sampled image of the current frame and the down-sampled image of the previous frame by bilinear interpolation algorithm, bicubic interpolation algorithm, or Lanczos interpolation algorithm.

In some embodiments, performing motion estimation on the down-sampled image of the current frame and the down-sampled image of the previous frame by a full search algorithm or 3D recursive search algorithm.

In some embodiments, the image of the current frame is an RGB image or YUV image.

In some embodiments, a display driving module comprising: a down-sampling unit configured to down-sample an image of a current frame to obtain a down-sampled image of the current frame; a decompressing unit configured to acquire and decompress a compressed down-sampled image of an image of a previous frame to obtain a down-sampled image of the previous frame; an up-sampling unit configured to up-sample the down-sampled image of the current frame and the down-sampled image of the previous frame respectively to obtain an up-sampled image of the current frame and an up-sampled image of the previous frame; a restoration unit configured to perform high-frequency information restoration on the up-sampled image of the current frame and the up-sampled image of the previous frame to obtain a restored image of the current frame and a restored image of the previous frame; and a pre-overdrive unit configured to generate corresponding pre-overdrive display data on the basis of the obtained restored image of the current frame and the restored image of the previous frame.

In some embodiments, the restoration unit is configured to divide the down-sampled image of the previous frame into corresponding multiple sub-blocks; traverse the sub-blocks in the down-sampled image of the previous frame to obtain a current sub-block to be traversed; obtain a matching block in the down-sampled image of the current frame corresponding to the current sub-block in the down-sampled image of the previous frame; calculate a motion vector of the current sub-block in the down-sampled image of the previous frame pointing to the corresponding matching block in the down-sampled image of the current frame and a confidence coefficient of the motion vector; based on the calculated motion vector and a high-frequency image of the current frame extracted from the image of the current frame, calculate a high-frequency restored image of the corresponding sub-block in the image of the previous frame; based on the high-frequency restored image of the corresponding sub-block in the image of the previous frame and the confidence coefficient of the motion vector corresponding to the current sub-block in the down-sampled image of the previous frame, calculate a restored image of the corresponding sub-block in the image of previous frame; obtain a next sub-block in the down-sampled image of the previous frame as the current sub-block to be traversed, and restart execution from the step of obtaining a matching block in the down-sampled image of the current frame corresponding to the current sub-block in the down-sampled image of the previous frame, until the traversal of the sub-blocks in the down-sampled image of the previous frame is completed.

In some embodiments, the restoration unit is configured to calculate a restored image of the corresponding sub-block in the image of the previous frame by the following formula: $pre\_fs'=pre\_us+\alpha*pre\_hp$; wherein, $pre\_fs'$ indicates the restored image of the corresponding sub-block in the image of the previous frame, $pre\_us$ indicates the up-sampled image of the corresponding sub-block in the up-sampled image of the previous frame, $\alpha$ indicates the confidence coefficient of the motion vector of the current sub-block in the down-sampled image of the previous frame pointing to the corresponding matching block in the down-sampled image of the current frame, $pre\_hp$ indicates the high-frequency restored image of the corresponding sub-block in the up-sampled image of the previous frame.

In some embodiments, the restoration unit is further configured to perform high-frequency information restoration on each corresponding sub-block in the up-sampled image of the current frame based on the calculated confidence coefficient of the motion vector corresponding to each sub-block in the down-sampled image of the previous frame, and a high-frequency image of the current frame extracted from the image of the current frame.

In some embodiments, the restoration unit is configured to traverse the sub-blocks in the down-sampled image of the previous frame to obtain a current sub-block to be traversed; determine whether the confidence coefficient of the motion vector corresponding to the current sub-block is greater than or equal to a preset confidence coefficient threshold; in response to a determination that the confidence coefficient of the motion vector corresponding to the current sub-block is greater than or equal to a preset confidence coefficient threshold, based on the calculated confidence coefficient of the motion vector corresponding to the current sub-block and a high-frequency image of the current frame extracted from the image of the current frame, calculate a restored image of the corresponding sub-block in the image of the current frame; obtain a next sub-block in the down-sampled image of the previous frame as the current sub-block to be traversed, and restart execution from the step of determining whether the confidence coefficient of the motion vector corresponding to the current sub-block is greater than or equal to a preset confidence coefficient threshold, until the traversal of all sub-blocks in the down-sampled image of the previous frame is completed.

In some embodiments, the restoration unit is configured to calculate a restored image of the corresponding sub-block in the image of the previous frame by the following formula in response to a determination that the confidence coefficient of the motion vector corresponding to the current sub-block is greater than or equal to a preset confidence coefficient threshold: cur_fs'=cur_us+α *cur_hp; wherein, cur_fs' indicates the restored image of the corresponding sub-block in the image of the current frame, cur_us indicates the up-sampled image of the corresponding sub-block in the up-sampled image of the current frame, α indicates the confidence coefficient of the motion vector of the current sub-block in the down-sampled image of the previous frame pointing to the corresponding matching block in the down-sampled image of the current frame, cur_hp indicates the high-frequency image of the corresponding sub-block in the image of the current frame.

In some embodiments, the restoration unit is further configured to set the corresponding sub-block in the image of the current frame as the restored image of the corresponding sub-block in the restored image of the current frame in response to a determination that the confidence coefficient of the motion vector corresponding to the current sub-block is smaller than the confidence coefficient threshold.

In some embodiments, the restoration unit is further configured to calculate a restored image of the corresponding sub-block in the image of the current frame by the following formula in response to a determination that the confidence coefficient of the motion vector corresponding to the current sub-block is greater than or equal to a preset confidence coefficient threshold: cur_fs'=cur_us+cur_hp; wherein, cur_fs' indicates the restored image of the corresponding sub-block in the image of the current frame, cur_us indicates the up-sampled image of the corresponding sub-block in the up-sampled image of the current frame, cur_hp indicates the high-frequency image of the corresponding sub-block in the image of the current frame.

In some embodiments, the up-sampling unit is configured to up-sample the down-sampled image of the current frame and the down-sampled image of the previous frame by bilinear interpolation algorithm, bicubic interpolation algorithm, or Lanczos interpolation algorithm.

In some embodiments, the restoration unit is configured to perform motion estimation on the down-sampled image of the current frame and the down-sampled image of the previous frame by a full search algorithm or 3D recursive search algorithm.

In some embodiments, the image of the current frame is an RGB image or YUV image.

In some embodiments, a chip, wherein the display driving module is integrated into the chip.

In some embodiments, an electronic device, comprising at least one memory and at least one processor, the memory stores one or more computer instructions, wherein one or more computer instructions are executed by the processor to implement the display driving method provided by the embodiments of the present disclosure.

In some embodiments, a storage medium, wherein the storage medium stores at least one or more computer instructions, the one or more computer instructions are executed to implement the display driving method provided by the embodiments of the present disclosure.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 1 shows a flow diagram of a text compression method provided by an embodiment of the present disclosure.

DETAILED DESCRIPTION

Figure 2:
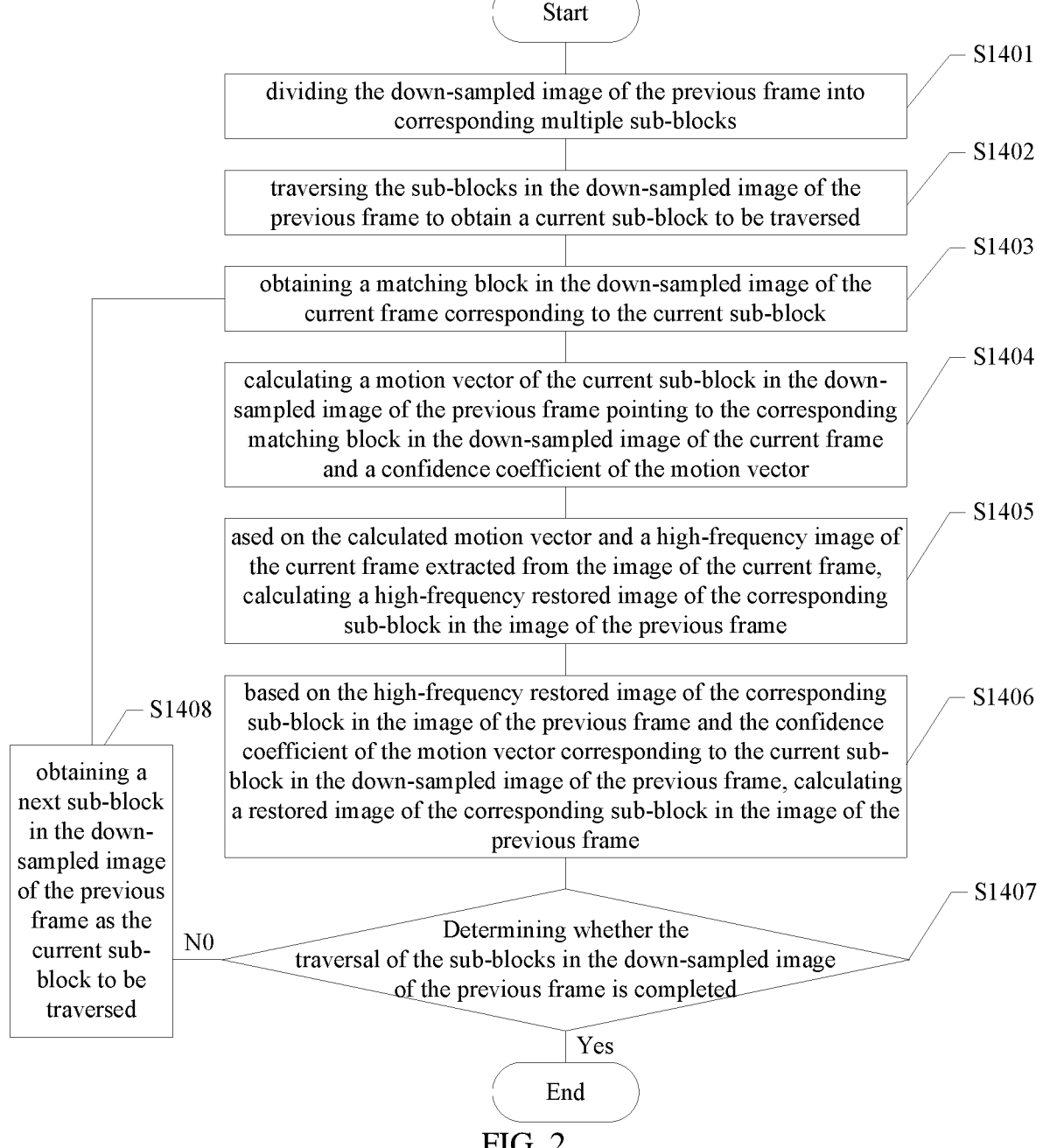
FIG. 2 shows a schematic diagram of the flow of a method for performing high-frequency information restoration on an up-sampled image of the previous frame provided by an embodiment of the present disclosure.

It can be seen from the prior art that the existing pre-overdrive display driving method has the problem of poor image quality when driving the liquid crystal display.

Specifically, when performing pre-overdrive display driving, the data of the current frame data and the data of the previous frame are required. Wherein, the data of the previous frame is obtained by writing the data of the current frame into the memory and reading it out from the memory after a delay of one frame. However, reading and writing data of the memory needs to consume the reading and writing bandwidth and storage space, thus there are problems of high cost and power consumption.

For this reason, in practical applications, the data of the current frame is compressed and written into the memory, and the compressed code stream is read out from the memory after a delay of one frame and then decompressed to restore the previous frame data, which saves reading and writing bandwidth and storage space of the memory.

However, the restored data obtained by decompressing the compressed data will cause the loss of high-frequency details, which affects the image quality presented by the liquid crystal display device.

To solve the above problems, the technical solutions of embodiments of the present disclosure obtain an up-sampled image of the current frame and an up-sampled image of the previous frame by up-sampling the down-sampled image of the current frame and the down-sampled image of the previous frame respectively, perform high-frequency information restoration on the up-sampled image of the current frame and the up-sampled image of the previous frame to obtain a restored image of the current frame and a restored image of the previous frame, and generate corresponding pre-overdrive display data on the basis of the obtained restored image of the current frame and the restored image of the previous frame, since the restored image of the previous frame is obtained after the high-frequency detail restoration of the up-sampled image of the previous frame, the image quality reduction caused by the loss of high-frequency detail in the restored image of the previous frame can be avoided, thereby the quality of the presented picture can be improved and the user's experience can be improved.

FIG. 1 shows a flow diagram of a display driving method provided by an embodiment of the present disclosure. Referring to FIG. 1, a display driving method may specifically comprising: step S110: down-sampling an image of a current frame to obtain a down-sampled image of the current frame; step S120: acquiring and decompressing a compressed down-sampled image of an image of a previous frame to obtain a down-sampled image of the previous frame; step S130: up-sampling the down-sampled image of the current frame and the down-sampled image of the previous frame respectively to obtain an up-sampled image of the current frame and an up-sampled image of the previous frame; step S140: performing high-frequency information restoration on the up-sampled image of the current frame and the up-sampled image of the previous frame to obtain a restored image of the current frame and a restored image of the previous frame; and step S150: based on the obtained restored image of the current frame and the restored image of the previous frame, generating corresponding pre-over-drive display data.

To make the above purposes, features, and advantages of the present disclosure more apparent and easier to understand, a detailed description of specific embodiments of the present disclosure will be given below in conjunction with the accompanying drawings.

Performing step S110, down-sampling an image of a current frame to obtain a down-sampled image of the current frame;

In specific implementations, the image of the current frame refers to the video image that needs to be displayed on the display device in the original unprocessed video image, which is also known as the C frame. Wherein the image format of the image of the current frame can be RGB, YUV image, or other image formats, and there is no limitation here.

In practical applications, the down-sampled image of the current frame obtained by down-sampling the image of the current frame has an image resolution smaller than the current frame image, when the down-sampled image of the current frame is compressed and written to the memory, the reading and writing bandwidth can be saved, and the occupied memory space can be saved.

In the embodiment of the disclosure, the down-sampling rate (M*M) used for down-sampling of the image of the current frame can be selected by those skilled in the art according to the actual needs, and there is no limitation here.

Performing step S120, acquiring and decompressing a compressed down-sampled image of an image of a previous frame to obtain a down-sampled image of the previous frame.

In a specific embodiment, the compressed down-sampled image of the image of the previous frame is obtained by down-sampling and compressing the image of the current frame and writing it into the memory, and then reading it from the memory after a delay of one frame and decompressing it.

The down-sampled image of the previous frame is obtained, which provides a basis for obtaining the up-sampled image of the previous frame and the restored image of the previous frame.

Step S130: up-sampling the down-sampled image of the current frame and the down-sampled image of the previous frame respectively to obtain an up-sampled image of the current frame and an up-sampled image of the previous frame.

As mentioned above, the down-sampled image of the current frame is obtained by down-sampling an image of a current frame, and the down-sampled image of the previous frame is obtained by acquiring and decompressing a compressed down-sampled image of an image of a previous frame from the memory.

Therefore, the resolution of the down-sampled image of the current frame and the down-sampled image of the previous frame is smaller than that of the image of the current frame and the image of the previous frame respectively. Hence to obtain an image with the same resolution as the current frame image and the previous frame image, the down-sampled image of the current frame and the down-sampled image of the previous frame can be respectively up-sampled so that the resolutions of the up-sampled image of the current frame and the up-sampled image of the previous frame obtained are respectively restored to the original resolutions of the image of the current frame and the image of the previous frame.

In a specific implementation, an interpolation algorithm may be used to respectively up-sample the down-sampled image of the current frame and the down-sampled image of the previous frame. Wherein, the interpolation algorithm may be selected according to actual requirements, such as a bilinear interpolation algorithm, bicubic interpolation algorithm, or Lanczos interpolation algorithm, etc., which are not limited here.

The up-sampled image of the current frame and the up-sampled image of the previous frame are obtained, which provide a basis for subsequently obtaining the restored image of the current frame and the restored image of the previous frame respectively.

Step S140: performing high-frequency information restoration on the up-sampled image of the current frame and the up-sampled image of the previous frame to obtain a restored image of the current frame and a restored image of the previous frame.

The method of motion estimation is a process that includes: dividing each frame of the image sequence into many non-overlapping blocks, and considering that the displacement of all pixels in the block is the same, then finding the most similar matching block of each sub-block respectively within a certain search range of the reference frame according to a preset matching criterion, calculating a relative displacement between the matching block and the sub-block, and configuring the obtained relative displacement as a motion vector.

In practical applications, based on the high-frequency image of the current frame extracted from the image of the current frame, the method of motion estimation can be used to perform high-frequency information restoration on the up-sampled image of the current frame and the up-sampled image of the previous frame.

Specifically, in an embodiment of the present disclosure, when performing high-frequency information restoration on the up-sampled image of the previous frame, first performing motion estimation based on the previously obtained down-sampled image of the current frame and the down-sampled image of the previous frame to obtain a motion vector of each sub-block in the down-sampled image of the previous frame pointing to the corresponding matching block in the down-sampled image of the current frame and a confidence coefficient of the motion vector, and then based on the calculated confidence coefficient of the motion vector corresponding to each sub-block and a high-frequency image of the current frame extracted from the image of the current frame, performing high-frequency information restoration on each corresponding sub-block in the up-sampled image of the previous frame, please refer to FIG. 2 for details.

FIG. 2 shows a schematic diagram of the flow of a method for performing high-frequency information restoration on an up-sampled image of the previous frame provided by an embodiment of the present disclosure. Referring to FIG. 2, a method for performing high-frequency information restoration of an up-sampled image of the previous frame may specifically include the following steps.

Step S1401: dividing the down-sampled image of the previous frame into corresponding multiple sub-blocks.

In a specific implementation, the size of each sub-block obtained by dividing the down-sampled image of the previous frame may be set according to actual needs, and there is no limitation here.

Dividing the down-sampled image of the previous frame into corresponding multiple sub-blocks provides a basis for subsequent motion estimation in units of blocks.

Step S1402: traversing the sub-blocks in the down-sampled image of the previous frame to obtain a current sub-block to be traversed.

In a specific implementation, traversing the sub-blocks in the down-sampled image of the previous frame in a preset order. A current sub-block to be traversed provides a basis for subsequently obtaining a matching block in the down-sampled image of the current frame.

Step S1403: obtaining a matching block in the down-sampled image of the current frame corresponding to the current sub-block.

In a specific implementation, a preset matching block search algorithm may be used to search the down-sampled image of the current frame to obtain the matching block most similar to the current sub-block in the down-sampled image of the previous frame. Wherein, the matching block search algorithm used may be selected according to actual requirements, such as a global search (Full Search) algorithm or a three-dimensional recursive search (3D Recursive Search) algorithm, etc., which are not limited here.

Taking the global search algorithm as an example, the current sub-block in the down-sampled image of the previous frame is block-matched with all blocks within the search range of the corresponding position in the down-sampled image of the current frame, calculating the distance between the current sub-block in the down-sampled image of the previous frame and all blocks within the search range of the corresponding position in the down-sampled image of the current frame, and the matching block corresponding to the calculated minimum distance is configured as the matching block of the current sub-block in the down-sampled image of the current frame and the down-sampled image of the previous frame.

Obtaining a matching block in the down-sampled image of the current frame corresponding to the current sub-block in the down-sampled image of the previous frame provides a basis for subsequently calculating a motion vector of the current sub-block in the down-sampled image of the previous frame pointing to the corresponding matching block in the down-sampled image of the current frame and a confidence coefficient of the motion vector.

Step S1404: calculating a motion vector of the current sub-block in the down-sampled image of the previous frame pointing to the corresponding matching block in the down-sampled image of the current frame and a confidence coefficient of the motion vector.

As mentioned above, a motion vector of the current sub-block in the down-sampled image of the previous frame pointing to the corresponding matching block in the down-sampled image of the current frame, which is the displacement between the current sub-block in the down-sampled image of the previous frame and the corresponding matching block in the down-sampled image of the current frame, and the direction of the displacement is the direction of the current sub-block in the down-sampled image of the previous frame pointing to the corresponding matching block in the down-sampled image of the current frame.

The confidence coefficient of the motion vector is related to the sum of absolute difference (SAD) and the texture (Detail) of the current sub-block in the down-sampled image of the previous frame pointing to the corresponding matching block in the down-sampled image of the current frame, and the motion vector difference (MVDiff) between the current sub-block in the down-sampled image of the previous frame and the surrounding sub-blocks within a preset range centered on the current sub-block.

Specifically, the confidence coefficient of the motion vector is positively correlated with the sum of the absolute difference SAD of the current sub-block in the down-sampled image of the previous frame pointing to the corresponding matching block in the down-sampled image of the current frame and the motion vector difference MVDiff between the current sub-block in the down-sampled image of the previous frame and the surrounding sub-blocks within a preset range centered on the current sub-block and is negatively correlated with the texture Detail of the current sub-block in the down-sampled image of the previous frame pointing to the corresponding matching block in the down-sampled image of the current frame.

In an actual process, the confidence coefficient of the motion vector can be calculated and obtained by selecting an appropriate function according to the above-mentioned correlation. At the same time, according to the actual situation and requirements, utilizing the chosen function to adjust the importance and priority of the sum of absolute difference SAD and the texture Detail of the current sub-block in the down-sampled image of the previous frame pointing to the corresponding matching block in the down-sampled image of the current frame, and the motion vector difference MVDiff between the current sub-block in the down-sampled image of the previous frame and the surrounding sub-blocks within a preset range centered on the current sub-block, to obtain an optimal confidence coefficient of the motion vector, thereby improving the accuracy of the subsequent restored image generated.

Step S1405: based on the calculated motion vector and a high-frequency image of the current frame extracted from the image of the current frame, calculating a high-frequency restored image of the corresponding sub-block in the image of the previous frame.

In a practical application process, the high-frequency image of the current frame can be obtained by performing low-pass filtering on the image of the current frame.

In a specific implementation, configure the motion vector of the current sub-block in the down-sampled image of the previous frame pointing to the corresponding matching block in the down-sampled image of the current frame as the motion vector of the corresponding block in the image of the previous frame pointing to the corresponding matching block in the high-frequency image of the current frame, and using an interpolation algorithm, such as a bilinear interpolation algorithm, etc., the high-frequency restored image of the corresponding block in the image of the previous frame can be calculated.

Obtaining a high-frequency restored image of the corresponding sub-block in the image of the previous frame provides a basis for subsequent performing high-frequency information restoration on the corresponding sub-block in the image of the previous frame.

Step S1406: based on the high-frequency restored image of the corresponding sub-block in the image of the previous frame and the confidence coefficient of the motion vector corresponding to the current sub-block in the down-sampled image of the previous frame, calculating a restored image of the corresponding sub-block in the image of the previous frame.

In the embodiment of the present disclosure, after obtaining the high-frequency restored image of each block in the image of the previous frame, calculating the high-frequency image of each corresponding sub-block in the image of the previous frame by the following formula: $pre\_fs'=pre\_us+\alpha*pre\_hp$ (2).

Wherein, $pre\_fs'$ indicates the restored image of the corresponding sub-block in the image of the previous frame, $pre\_us$ indicates the up-sampled image of the corresponding sub-block in the up-sampled image of the previous frame, $\alpha$ indicates the confidence coefficient of the motion vector of the current sub-block in the down-sampled image of the previous frame pointing to the corresponding matching block in the down-sampled image of the current frame, $pre\_hp$ indicates the high-frequency restored image of the corresponding sub-block in the up-sampled image of the previous frame.

From the above formula (2), we can know that when the confidence coefficient $\alpha$ the motion vector is larger, the calculated motion vector of the current sub-block in the down-sampled image of the previous frame pointing to the corresponding matching block in the down-sampled image of the current frame is more reliable, and the higher the proportion of the high-frequency restored image $pre\_hp$ of the corresponding sub-block in the up-sampled image of the previous frame in the restored image $pre\_fs'$ of the corresponding sub-block in the image of the previous frame; on the contrary, the smaller the proportion of the high-frequency restored image $pre\_hp$ of the corresponding sub-block in the up-sampled image of the previous frame in the restored image $pre\_fs'$ of the corresponding sub-block in the image of the previous frame.

Therefore, the proportion of the high-frequency restored image $pre\_hp$ of the corresponding sub-block in the up-sampled image of the previous frame in the restored image $pre\_fs'$ of the corresponding sub-block in the image of the previous frame can be adjusted by the confidence coefficient $\alpha$ of the motion vector to ensure the accuracy of the restored image $pre\_fs'$.

Step S1407: determining whether the traversal of the sub-blocks in the down-sampled image of the previous frame is completed; end the operation in response to a determination of yes; otherwise, step S1408 may be executed.

Step S1408: obtaining a next sub-block in the down-sampled image of the previous frame as the current sub-block to be traversed, and restarting execution from step S1403.

In a specific implementation, obtain the next sub-block in the down-sampled image of the previous frame in a preset order in response to a determination that the traversal of all sub-blocks in the down-sampled image of the previous frame is not completed, set the obtained next sub-block as the current sub-block, and restart execution from the step S1403 until the traversal of all sub-blocks in the down-sampled image of the previous frame is completed, complete the high-frequency information restoration of all blocks in the up-sampled image of the previous frame, and obtain the restored image of the previous frame.

Figure 3:
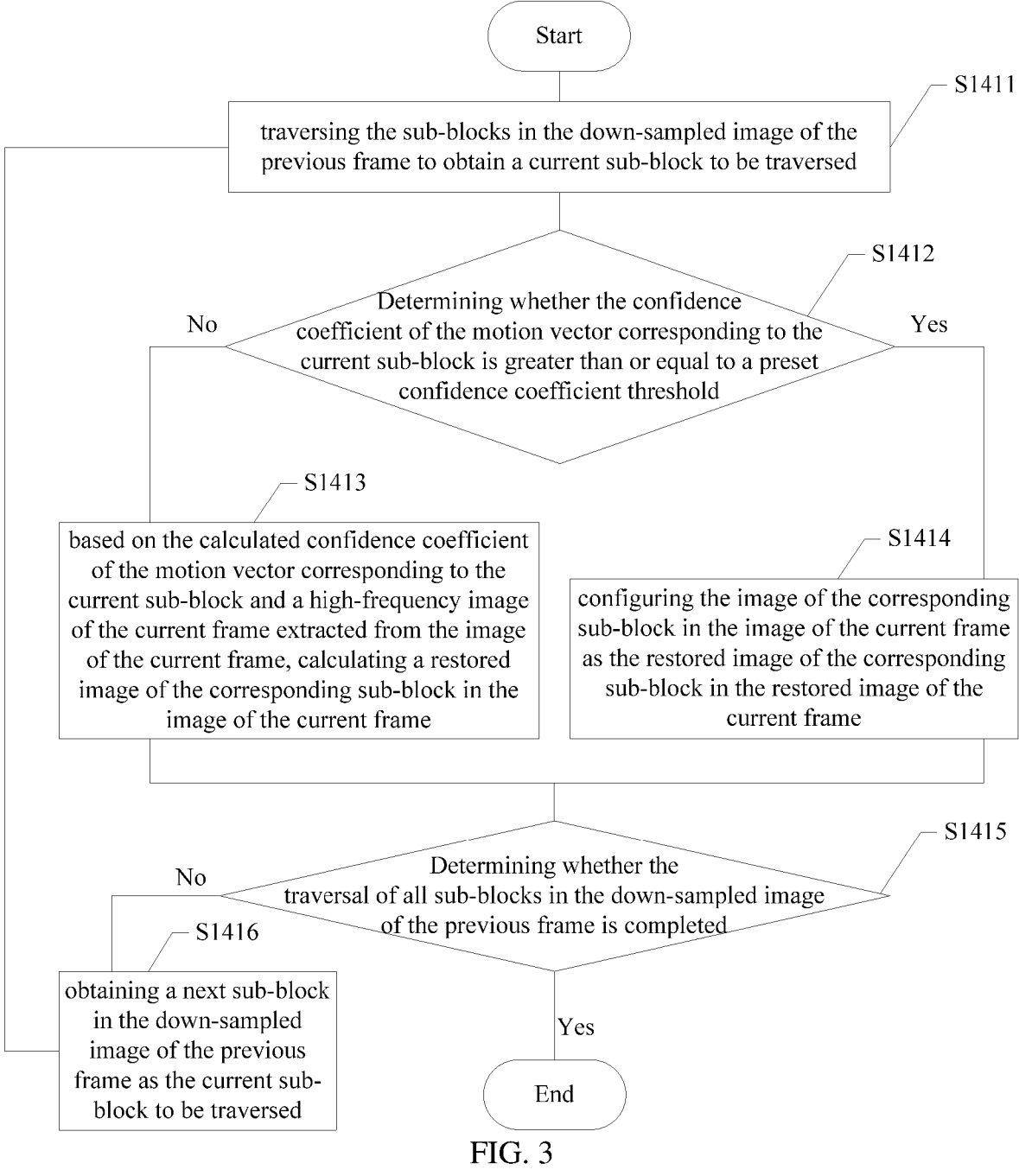
FIG. 3 shows a schematic diagram of the flow of a method for performing high-frequency information restoration on an up-sampled image of the current frame provided by an embodiment of the present disclosure.

Specifically, in an embodiment of the present disclosure, when performing high-frequency information restoration on the up-sampled image of the previous frame, based on the calculated motion vector of each sub-block in the image of the previous frame pointing to the corresponding sub-block in the image of the current frame and the calculated confidence coefficient of the motion vector and the high-frequency image of the current frame extracted from the image of the current frame, performing high-frequency information restoration on each corresponding sub-block in the up-sampled image of the current frame, please refer to FIG. 3 for details.

FIG. 3 shows a schematic diagram of the flow of a method for performing high-frequency information restoration on an up-sampled image of the current frame provided by an embodiment of the present disclosure. Referring to FIG. 3, a method for performing high-frequency information restoration on an up-sampled image of the current frame may specifically include the following steps.

Performing step S1411: traversing the sub-blocks in the down-sampled image of the previous frame to obtain a current sub-block to be traversed.

In a specific implementation, traversing the sub-blocks in the down-sampled image of the previous frame in a preset order.

Traversing the sub-blocks in the down-sampled image of the previous frame provides a basis for subsequent performing high-frequency information restoration on each corresponding sub-block in the image of the current frame.

Performing step S1412, determining whether the confidence coefficient of the motion vector corresponding to the current sub-block is greater than or equal to a preset confidence coefficient threshold; performing step S1413 in response to a determination of yes; otherwise, performing step S1414.

In a specific implementation, the confidence coefficient threshold is configured to ensure that the error of the calculated motion vector is not too large, thereby the accuracy of the restored image obtained by subsequent calculation corresponding to the sub-block in the image of the current frame can be ensured.

In a specific implementation, the confidence coefficient threshold can be a preset specific value. Wherein, the specific value can be set according to prior experience or can be an adaptive value determined through statistical analysis, and those skilled in the art can set it according to actual needs, as long as the set confidence coefficient threshold is beneficial to ensure the accuracy of the restored image of the current frame, and there is no limitation here.

Performing step S1413, based on the calculated confidence coefficient of the motion vector corresponding to the current sub-block and a high-frequency image of the current frame extracted from the image of the current frame, calculating a restored image of the corresponding sub-block in the image of the current frame.

In a specific implementation, when it is determined that the confidence coefficient of the motion vector corresponding to the current sub-block is greater than or equal to a preset confidence coefficient threshold, it indicates that the calculated motion vector of the current sub-block in the down-sampled image of the previous frame pointing to the corresponding matching block in the down-sampled image of the current frame is reliable. In this situation, based on the calculated confidence coefficient of the motion vector corresponding to the current sub-block in the down-sampled image of the previous frame and a high-frequency image of the current frame extracted from the image of the current frame, calculating a restored image of the corresponding sub-block in the image of the current frame.

Specifically, in an embodiment of the present disclosure, calculate the restored image of the corresponding sub-block in the image of the current frame by the following formula: $cur\_fs'=cur\_us+\alpha*cur\_hp$ (3).

wherein, $cur\_fs'$ indicates the restored image of the corresponding sub-block in the image of the current frame, $cur\_us$ indicates the up-sampled image of the corresponding sub-block in the up-sampled image of the current frame, $\alpha$ indicates the confidence coefficient of the motion vector of the current sub-block in the down-sampled image of the previous frame pointing to the corresponding matching block in the down-sampled image of the current frame, $cur\_hp$ indicates the high-frequency image of the corresponding sub-block in the image of the current frame.

Performing step S1414, configuring the image of the corresponding sub-block in the image of the current frame as the restored image of the corresponding sub-block in the restored image of the current frame.

In a specific implementation, when it is determined that the confidence coefficient of the motion vector corresponding to the current sub-block is smaller than the preset confidence coefficient threshold, it indicates that the reliability of the calculated motion vector of the current sub-block in the down-sampled image of the previous frame pointing to the corresponding matching block in the down-sampled image of the current frame is poor. In this situation, to ensure the accuracy of the restored image of the current frame, the image of the corresponding sub-block in the image of the current frame can be configured directly as the restored image of the corresponding sub-block in the restored image of the current frame, that is $cur\_fs'=cur\_fs$ (4).

Wherein, $cur\_fs$ indicates the image of the corresponding sub-block in the image of the current frame.

From the above formula (4), when the reliability of the calculated motion vector of the current sub-block in the down-sampled image of the previous frame pointing to the corresponding matching block in the down-sampled image of the current frame is poor, by directly utilizing the high-frequency image of the current frame extracted from the image of the current frame to perform high-frequency information restoration on the sub-blocks in the up-sampled image of the current frame, the problem of low accuracy of the generated restored image of the current frame caused by the unreliability of the calculated motion vector can be avoided, thus the chaotic situation of pre-overdrive caused by unreliable calculated motion vectors can be avoided.

Performing step S1415: determining whether the traversal of all sub-blocks in the down-sampled image of the previous frame is completed; end the operation in response to a determination of yes; otherwise, step S1416 may be executed.

Performing step S1416: obtaining a next sub-block in the down-sampled image of the previous frame as the current sub-block to be traversed, and restarting execution from step S1413.

In a specific implementation, obtain the next sub-block in the down-sampled image of the previous frame in a preset order in response to a determination that the traversal of all sub-blocks in the down-sampled image of the previous frame is not completed, set the obtained next sub-block as the current sub-block, and restart execution from the step S1413 until the traversal of all sub-blocks in the down-sampled image of the previous frame is completed, and obtain the restored image of the current frame.

Performing step S150, based on the obtained restored image of the current frame and the restored image of the previous frame, generating corresponding pre-overdrive display data.

In a specific implementation, when the restored image of the current frame and the restored image of the previous frame are obtained, the restored image of the previous frame can be used as a reference image, comparing the restored image of the current frame with the restored image of the previous frame, and generate corresponding pre-overdrive display data according to the comparison result.

Specifically, in an embodiment of the present disclosure, obtain the corresponding pre-overdrive display data by the following formula: $od\_display\_out=cur\_fs+lut(cur\_fs', pre\_fs')$ (5).

Wherein, $od\_display\_out$ represents the pre-overdrive display data of the current frame, and $lut(\cdot)$ represents the table lookup operation.

The display driving method provided by the embodiment of the present disclosure has been described in detail above. Correspondingly, the embodiment of the present disclosure also provides a display driving module.

Figure 4:
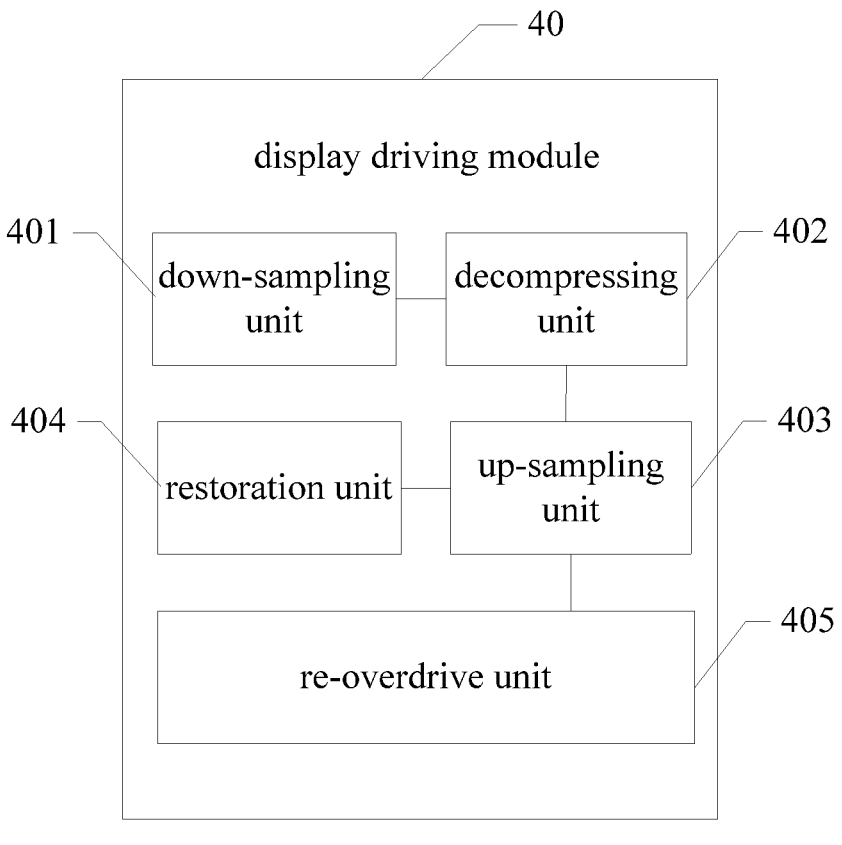
FIG. 4 shows a block diagram of a display driving module provided by an embodiment of the present disclosure.

FIG. 4 shows a block diagram of a display driving module provided by an embodiment of the present disclosure. Referring to FIG. 4, a display driving module comprising: a down-sampling unit 401, a decompressing unit 402, an up-sampling unit 403, a restoration unit 404, and a pre-overdrive unit 405.

Wherein, the down-sampling unit 401 is configured to down-sample an image of a current frame to obtain a down-sampled image of the current frame. In the embodiments of the present disclosure, the image of the current frame is RGB image or YUV image; the decompressing unit 402 is configured to acquire and decompress a compressed down-sampled image of an image of a previous frame to obtain a down-sampled image of the previous frame; the up-sampling unit 403 is configured to up-sample the down-sampled image of the current frame and the down-sampled image of the previous frame respectively to obtain an up-sampled image of the current frame and an up-sampled image of the previous frame; the restoration unit 404 is configured to perform high-frequency information restoration on the up-sampled image of the current frame and the up-sampled image of the previous frame to obtain a restored image of the current frame and a restored image of the previous frame; and the pre-overdrive unit 405 is configured o generate corresponding pre-overdrive display data on the basis of the obtained restored image of the current frame and the restored image of the previous frame.

In an embodiments of the present disclosure, the restoration unit 404 is configured to divide the down-sampled image of the previous frame into corresponding multiple sub-blocks; traverse the sub-blocks in the down-sampled image of the previous frame to obtain a current sub-block to be traversed; obtain a matching block in the down-sampled image of the current frame corresponding to the current sub-block in the down-sampled image of the previous frame; calculate a motion vector of the current sub-block in the down-sampled image of the previous frame pointing to the corresponding matching block in the down-sampled image of the current frame and a confidence coefficient of the motion vector; based on the calculated motion vector and a high-frequency image of the current frame extracted from the image of the current frame, calculate a high-frequency restored image of the corresponding sub-block in the image of the previous frame; based on the high-frequency restored image of the corresponding sub-block in the image of the previous frame and the confidence coefficient of the motion vector corresponding to the current sub-block in the down-sampled image of the previous frame, calculate a restored image of the corresponding sub-block in the image of previous frame; obtain a next sub-block in the down-sampled image of the previous frame as the current sub-block to be traversed, and restart execution from the step of obtaining a matching block in the down-sampled image of the current frame corresponding to the current sub-block in the down-sampled image of the previous frame, until the traversal of the sub-blocks in the down-sampled image of the previous frame is completed.

Specifically, the restoration unit 404 is configured to calculate a restored image of the corresponding sub-block in the image of the previous frame by the following formula: $pre\_fs'=pre\_us+\alpha *pre\_hp$.

wherein, $pre\_fs'$ indicates the restored image of the corresponding sub-block in the image of the previous frame, $pre\_us$ indicates the up-sampled image of the corresponding sub-block in the up-sampled image of the previous frame, $\alpha$ indicates the confidence coefficient of the motion vector of the current sub-block in the down-sampled image of the previous frame pointing to the corresponding matching block in the down-sampled image of the current frame, $pre\_hp$ indicates the high-frequency restored image of the corresponding sub-block in the up-sampled image of the previous frame.

In another embodiment of the present disclosure, the restoration unit 404 is further configured to perform high-frequency information restoration on each corresponding sub-block in the up-sampled image of the current frame based on the calculated confidence coefficient of the motion vector corresponding to each sub-block in the down-sampled image of the previous frame, and a high-frequency image of the current frame extracted from the image of the current frame.

In another embodiment of the present disclosure, the restoration unit 404 is configured to traverse the sub-blocks in the down-sampled image of the previous frame to obtain a current sub-block to be traversed; determine whether the confidence coefficient of the motion vector corresponding to the current sub-block is greater than or equal to a preset confidence coefficient threshold; in response to a determination that the confidence coefficient of the motion vector corresponding to the current sub-block is greater than or equal to a preset confidence coefficient threshold, based on the calculated confidence coefficient of the motion vector corresponding to the current sub-block and a high-frequency image of the current frame extracted from the image of the current frame, calculate a restored image of the corresponding sub-block in the image of the current frame; obtain a next sub-block in the down-sampled image of the previous frame as the current sub-block to be traversed, and restart execution from the step of determining whether the confidence coefficient of the motion vector corresponding to the current sub-block is greater than or equal to a preset confidence coefficient threshold, until the traversal of all sub-blocks in the down-sampled image of the previous frame is completed.

Specifically, the restoration unit 404 is further configured to calculate a restored image of the corresponding sub-block in the image of the current frame by the following formula in response to a determination that the confidence coefficient of the motion vector corresponding to the current sub-block is greater than or equal to a preset confidence coefficient threshold: $cur\_fs'=cur\_us+\alpha*cur\_hp$.

wherein, $cur\_fs'$ indicates the restored image of the corresponding sub-block in the image of the current frame, $cur\_us$ indicates the up-sampled image of the corresponding sub-block in the up-sampled image of the current frame, $\alpha$ indicates the confidence coefficient of the motion vector of the current sub-block in the down-sampled image of the previous frame pointing to the corresponding matching block in the down-sampled image of the current frame, $cur\_hp$ indicates the high-frequency image of the corresponding sub-block in the image of the current frame.

In another embodiment of the disclosure, the restoration unit 404 is further configured to set the corresponding sub-block in the image of the current frame as the restored image of the corresponding sub-block in the restored image of the current frame in response to a determination that the confidence coefficient of the motion vector corresponding to the current sub-block is smaller than the confidence coefficient threshold.

Specifically, the restoration unit 404 is further configured to calculate a restored image of the corresponding sub-block in the image of the current frame by the following formula in response to a determination that the confidence coefficient of the motion vector corresponding to the current sub-block is greater than or equal to a preset confidence coefficient threshold: $cur\_fs'=cur\_us+cur\_hp$.

wherein, $cur\_fs'$ indicates the restored image of the corresponding sub-block in the image of the current frame, $cur\_us$ indicates the up-sampled image of the corresponding sub-block in the up-sampled image of the current frame, $cur\_hp$ indicates the high-frequency image of the corresponding sub-block in the image of the current frame.

In the embodiments of the present disclosure, the up-sampling unit 403 is configured to up-sample the down-sampled image of the current frame and the down-sampled image of the previous frame by bilinear interpolation algorithm, bicubic interpolation algorithm, or Lanczos interpolation algorithm.

In the embodiments of the present disclosure, the restoration unit 404 is configured to obtain a matching block in the down-sampled image of the current frame corresponding to the current sub-block in the down-sampled image of the previous frame by full search algorithm or 3D recursive search algorithm.

Correspondingly, the embodiments of the present disclosure also provide a chip, wherein the display driving module provided by the embodiments of the present disclosure is integrated into the chip. Wherein, please refer to the introduction in the foregoing part for the display driving module, and details will not be repeated here.

Correspondingly, the embodiments of the present disclosure also provide an electronic device, comprising at least one memory and at least one processor, the memory stores one or more computer instructions, wherein the one or more computer instructions are executed by the processor to implement the display driving method provided by the embodiments of the present disclosure. Wherein, please refer to the introduction in the foregoing part for the display driving method, and details will not be repeated here.

Figure 5:
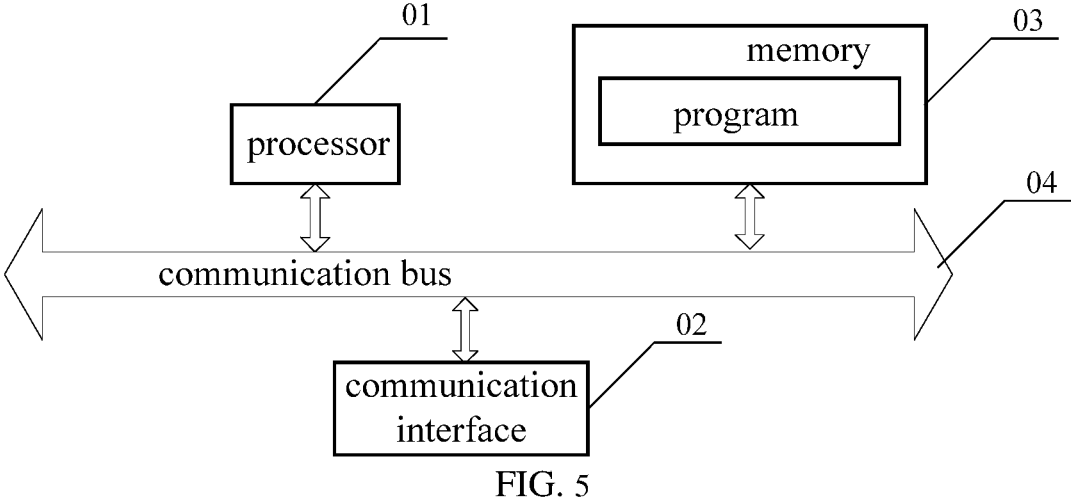
FIG. 5 shows a schematic diagram of an optional hardware structure of the electronic device provided by the embodiment of the present disclosure.

FIG. 5 shows a schematic diagram of an optional hardware structure of the electronic device provided by the embodiments of the present disclosure. Referring to FIG. 5, the electronic device may include at least one processor 01, at least one communication interface 02, at least one memory 03, and at least one communication bus 04.

In the embodiments of the present disclosure, there are at least one processor 01, at least one communication interface 02, at least one memory 03, and at least one communication bus 04, and the processor 01, communication interface 02, and memory 03 complete mutual communication through the communication bus 04.

The communication interface 02 may be an interface of a communication module for network communication, such as an interface of a GSM module.

Processor 01 may be a central processing unit CPU, an application-specific integrated circuit (ASIC), or one or more integrated circuits configured to implement the embodiments of the present disclosure.

Memory 03 may include high-speed RAM, and may also include non-volatile memory (NVM), such as at least one disk memory.

Wherein, memory 03 stores one or more computer instructions, the one or more computer instructions are executed by processor 01 to implement the display driving method provided by the embodiments of the present disclosure.

It should be noted that the electronic device implemented above may also include other components (not shown) that may not be necessary for the content disclosed in the embodiments of the present disclosure; since these other devices may not be necessary for understanding the disclosure of the embodiments of the present disclosure, the embodiments of the present disclosure will not introduce them one by one here.

The embodiments of the present disclosure also provide a storage medium, wherein the storage medium stores at least one or more computer instructions, the one or more computer instructions are executed to implement the display driving method provided by the embodiments of the present disclosure.

The embodiments of the present disclosure described above are combinations of elements and features of the present disclosure. The elements or features may be considered optional unless mentioned otherwise. Each element or feature may be practiced without being combined with other elements or features. In addition, the embodiments of the present disclosure may be configured by combining some elements and/or features. The order of operations described in the embodiments of the present disclosure may be rearranged. Some constructions of any one embodiment may be included in another embodiment and may be replaced with corresponding constructions of another embodiment. It is obvious to those skilled in the art that claims that have no explicit citation relationship with each other among the appended claims may be combined in the embodiments of the present disclosure or may be included as new claims in amendments after filing the present application.

Embodiments of the present disclosure can be realized by various means such as hardware, firmware, software, or a combination thereof. In the hardware configuration mode, the method according to the embodiments of the present disclosure may be implemented by one or more application-specific integrated circuits (ASICs), digital signal processors (DSPs), digital signal processing devices (DSPDs), programmable logic devices (PLDs), field programmable Gate arrays (FPGA), processors, controllers, micro-controllers, microprocessors, etc. to achieve.

In a firmware or software configuration, the embodiments of the present disclosure can be implemented in the form of modules, procedures, functions, and the like. The software codes may be stored in memory units and executed by processors. The memory unit is located inside or outside the processor and can transmit data to and receive data from the processor via various known means.

The above description of the disclosed embodiments is provided to enable any person skilled in the art to make or use the embodiments of the present disclosure. Various modifications to these embodiments will be readily apparent to those skilled in the art, and the general principles defined herein may be implemented in other embodiments without departing from the spirit or scope of the disclosure. Therefore, the present disclosure will not be limited to the embodiments shown herein but is to be accorded the widest scope consistent with the principles and novel features disclosed herein.

Although the embodiments of the present disclosure are disclosed as above, the present disclosure is not limited therein. Any person skilled in the art may make various changes and modifications without departing from the spirit and scope of the present disclosure, and therefore the scope of protection of the present disclosure shall be subject to the scope defined by the claims.

What is claimed is:

1. A display driving method, comprising:
down-sampling an image of a current frame to obtain a down-sampled image of the current frame;
acquiring and decompressing a compressed down-sampled image of an image of a previous frame to obtain a down-sampled image of the previous frame;
up-sampling the down-sampled image of the current frame and the down-sampled image of the previous frame respectively to obtain an up-sampled image of the current frame and an up-sampled image of the previous frame;

performing high-frequency information restoration on the up-sampled image of the current frame and the up-sampled image of the previous frame to obtain a restored image of the current frame and a restored image of the previous frame; and based on the obtained restored image of the current frame and the restored image of the previous frame, generating corresponding pre-overdrive display data.

2. The display driving method of claim 1, wherein performing high-frequency information restoration on the up-sampled image of the previous frame comprises:

dividing the down-sampled image of the previous frame into corresponding multiple sub-blocks;

traversing the sub-blocks in the down-sampled image of the previous frame to obtain a current sub-block to be traversed;

obtaining a matching block in the down-sampled image of the current frame corresponding to the current sub-block in the down-sampled image of the previous frame;

calculating a motion vector of the current sub-block in the down-sampled image of the previous frame pointing to the corresponding matching block in the down-sampled image of the current frame and a confidence coefficient of the motion vector;

based on the calculated motion vector and a high-frequency image of the current frame extracted from the image of the current frame, calculating a high-frequency restored image of the corresponding sub-block in the image of the previous frame;

based on the high-frequency restored image of the corresponding sub-block in the image of the previous frame and the confidence coefficient of the motion vector corresponding to the current sub-block in the down-sampled image of the previous frame, calculating a restored image of the corresponding sub-block in the image of previous frame; and obtaining a next sub-block in the down-sampled image of the previous frame as the current sub-block to be traversed, and restarting execution from obtaining a matching block in the down-sampled image of the current frame corresponding to the current sub-block in the down-sampled image of the previous frame, until the traversal of the sub-blocks in the down-sampled image of the previous frame is completed.

3. The display driving method of claim 2, wherein calculating a restored image of the corresponding sub-block in the image of the previous frame by the following formula:

$$\text{pre\_}fs' = \text{pre\_}us + \alpha * \text{pre\_}hp;$$

wherein, pre_fs indicates the restored image of the corresponding sub-block in the image of the previous frame, pre_us indicates the up-sampled image of the corresponding sub-block in the up-sampled image of the previous frame, α indicates the confidence coefficient of the motion vector of the current sub-block in the down-sampled image of the previous frame pointing to the corresponding matching block in the down-sampled image of the current frame, pre_hp indicates the high-frequency restored image of the corresponding sub-block in the up-sampled image of the previous frame.

4. The display driving method of claim 2, wherein performing high-frequency information restoration on the up-sampled image of the current frame comprises:

based on the calculated confidence coefficient of the motion vector corresponding to each sub-block in the down-sampled image of the previous frame, and a high-frequency image of the current frame extracted from the image of the current frame, performing high-frequency information restoration on each corresponding sub-block in the up-sampled image of the current frame.

5. The display driving method of claim 4, wherein based on the calculated confidence coefficient of the motion vector corresponding to each sub-block in the down-sampled image of the previous frame, and a high-frequency image of the current frame extracted from the image of the current frame, performing high-frequency information restoration on each corresponding sub-block in the up-sampled image of the current frame comprises:

traversing the sub-blocks in the down-sampled image of the previous frame to obtain a current sub-block to be traversed;

determining whether the confidence coefficient of the motion vector corresponding to the current sub-block is greater than or equal to a preset confidence coefficient threshold;

in response to a determination that the confidence coefficient of the motion vector corresponding to the current sub-block is greater than or equal to a preset confidence coefficient threshold, based on the calculated confidence coefficient of the motion vector corresponding to the current sub-block and a high-frequency image of the current frame extracted from the image of the current frame, calculating a restored image of the corresponding sub-block in the image of the current frame; and obtaining a next sub-block in the down-sampled image of the previous frame as the current sub-block to be traversed, and restarting execution from determining whether the confidence coefficient of the motion vector corresponding to the current sub-block is greater than or equal to a preset confidence coefficient threshold until the traversal of all sub-blocks in the down-sampled image of the previous frame is completed.

6. The display driving method of claim 4, wherein in response to a determination that the confidence coefficient of the motion vector corresponding to the current sub-block is greater than or equal to a preset confidence coefficient threshold, calculating a restored image of the corresponding sub-block in the image of the previous frame by the following formula:

$$\text{cur\_}fs' = \text{cur\_}us + \alpha * \text{cur\_}hp;$$

wherein, cur_fs' indicates the restored image of the corresponding sub-block in the image of the current frame, cur_us indicates the up-sampled image of the corresponding sub-block in the up-sampled image of the current frame, α indicates the confidence coefficient of the motion vector of the current sub-block in the down-sampled image of the previous frame pointing to the corresponding matching block in the down-sampled image of the current frame, cur_hp indicates the high-frequency image of the corresponding sub-block in the image of the current frame.

7. The display driving method of claim 5, wherein in response to a determination that the confidence coefficient of the motion vector corresponding to the current sub-block is smaller than the confidence coefficient threshold, based on a high-frequency image of the current frame extracted from the image of the current frame, and the calculated motion vector and the confidence coefficient of the motion vector corresponding to each sub-block, performing high-frequency information restoration on each corresponding sub-block in the up-sampled image of the current frame further comprises:

configuring the image of the corresponding sub-block in the image of the current frame as the restored image of the corresponding sub-block in the restored image of the current frame.

8. The display driving method of claim 7, wherein in response to a determination that the confidence coefficient of the motion vector corresponding to the current sub-block is smaller than the confidence coefficient threshold, calculating the restored image of the corresponding sub-block in the image of the current frame by the following formula:

$$\text{cur\_}fs'=\text{cur\_}us+\text{cur\_}hp;$$

wherein, cur_fs' indicates the restored image of the corresponding sub-block in the image of the current frame, cur_us indicates the up-sampled image of the corresponding sub-block in the up-sampled image of the current frame, cur_hp indicates the high-frequency image of the corresponding sub-block in the image of the current frame.

9. The display driving method of claim 1, wherein up-sampling the down-sampled image of the current frame and the down-sampled image of the previous frame by bilinear interpolation algorithm, bicubic interpolation algorithm, or Lanczos interpolation algorithm.

10. The display driving method of claim 1, wherein obtaining a matching block in the down-sampled image of the current frame corresponding to a current sub-block in the down-sampled image of the previous frame by full search algorithm or 3D recursive search algorithm.

11. The display driving method of claim 1, wherein the image of the current frame is an RGB image or YUV image.

12. A display driving module comprising a processor, wherein the processor is configured to:

down-sample an image of a current frame to obtain a down-sampled image of the current frame;

acquire and decompress a compressed down-sampled image of an image of a previous frame to obtain a down-sampled image of the previous frame;

up-sample the down-sampled image of the current frame and the down-sampled image of the previous frame respectively to obtain an up-sampled image of the current frame and an up-sampled image of the previous frame;

perform high-frequency information restoration on the up-sampled image of the current frame and the up-sampled image of the previous frame to obtain a restored image of the current frame and a restored image of the previous frame; and generate corresponding pre-overdrive display data based on the obtained restored image of the current frame and the restored image of the previous frame.

13. The display driving module of claim 12, wherein the processor is configured to divide the down-sampled image of the previous frame into corresponding multiple sub-blocks; traverse the sub-blocks in the down-sampled image of the previous frame to obtain a current sub-block to be traversed; obtain a matching block in the down-sampled image of the current frame corresponding to the current sub-block in the down-sampled image of the previous frame; calculate a motion vector of the current sub-block in the down-sampled image of the previous frame pointing to the corresponding matching block in the down-sampled image of the current frame and a confidence coefficient of the motion vector; and based on the calculated motion vector and a high-frequency image of the current frame extracted from the image of the current frame, calculate a high-frequency restored image of the corresponding sub-block in the image of the previous frame; based on the high-frequency restored image of the corresponding sub-block in the image of the previous frame and the confidence coefficient of the motion vector corresponding to the current sub-block in the down-sampled image of the previous frame, calculate a restored image of the corresponding sub-block in the image of previous frame; obtain a next sub-block in the down-sampled image of the previous frame as the current sub-block to be traversed, and restart execution from obtaining a matching block in the down-sampled image of the current frame corresponding to the current sub-block in the down-sampled image of the previous frame, until the traversal of the sub-blocks in the down-sampled image of the previous frame is completed.

14. The display driving module of claim 13, wherein the processor is configured to calculate a restored image of the corresponding sub-block in the image of the previous frame by the following formula:

$$\text{pre\_}fs'=\text{pre\_}us+\alpha*\text{pre\_}hp;$$

wherein, pre_fs' indicates the restored image of the corresponding sub-block in the image of the previous frame, pre_us indicates the up-sampled image of the corresponding sub-block in the up-sampled image of the previous frame, α indicates the confidence coefficient of the motion vector of the current sub-block in the down-sampled image of the previous frame pointing to the corresponding matching block in the down-sampled image of the current frame, pre_hp indicates the high-frequency restored image of the corresponding sub-block in the up-sampled image of the previous frame.

15. The display driving module of claim 13, wherein the processor is further configured to perform high-frequency information restoration on each corresponding sub-block in the up-sampled image of the current frame based on the calculated confidence coefficient of the motion vector corresponding to each sub-block in the down-sampled image of the previous frame, and a high-frequency image of the current frame extracted from the image of the current frame.

16. The display driving module of claim 15, wherein the processor is configured to traverse the sub-blocks in the down-sampled image of the previous frame to obtain a current sub-block to be traversed; determine whether the confidence coefficient of the motion vector corresponding to the current sub-block is greater than or equal to a preset confidence coefficient threshold; in response to a determination that the confidence coefficient of the motion vector corresponding to the current sub-block is greater than or equal to a preset confidence coefficient threshold, based on the calculated confidence coefficient of the motion vector corresponding to the current sub-block and a high-frequency image of the current frame extracted from the image of the current frame, calculate a restored image of the corresponding sub-block in the image of the current frame; obtain a next sub-block in the down-sampled image of the previous frame as the current sub-block to be traversed, and restart execution from determining whether the confidence coefficient of the motion vector corresponding to the current sub-block is greater than or equal to a preset confidence coefficient threshold, until the traversal of all sub-blocks in the down-sampled image of the previous frame is completed.

17. The display driving module of claim 16, wherein the processor is configured to calculate a restored image of the corresponding sub-block in the image of the previous frame by the following formula in response to a determination that the confidence coefficient of the motion vector corresponding to the current sub-block is greater than or equal to a preset confidence coefficient threshold:

$$\text{cur\_}fs'=\text{cur\_}us+\alpha^*\text{cur\_}hp;$$

wherein, cur_fs' indicates the restored image of the corresponding sub-block in the image of the current frame, cur_us indicates the up-sampled image of the corresponding sub-block in the up-sampled image of the current frame, $\alpha$ indicates the confidence coefficient of the motion vector of the current sub-block in the down-sampled image of the previous frame pointing to the corresponding matching block in the down-sampled image of the current frame, cur_hp indicates the high-frequency image of the corresponding sub-block in the image of the current frame.

18. The display driving module of claim 16, wherein processor is further configured to set the corresponding sub-block in the image of the current frame as the restored image of the corresponding sub-block in the restored image of the current frame in response to a determination that the confidence coefficient of the motion vector corresponding to the current sub-block is smaller than the confidence coefficient threshold.

19. The display driving module of claim 18, wherein the processor is further configured to calculate the restored image of the corresponding sub-block in the image of the current frame by the following formula in response to a determination that the confidence coefficient of the motion vector corresponding to the current sub-block is smaller than the confidence coefficient threshold:

$$\text{cur\_}fs'=\text{cur\_}us+\text{cur\_}hp;$$

wherein, cur_fs' indicates the restored image of the corresponding sub-block in the image of the current frame, cur_us indicates the up-sampled image of the corresponding sub-block in the up-sampled image of the current frame, cur_hp indicates the high-frequency image of the corresponding sub-block in the image of the current frame.

20. A chip, wherein the display driving module based on claim 12 is integrated into the chip.

* * * * *